United States Patent
Hibi et al.

(10) Patent No.: US 7,352,529 B2
(45) Date of Patent: Apr. 1, 2008

(54) MAGNETIC RECORDING MEDIUM AND MAGNETIC RECORDING AND REPRODUCING DEVICE USING A MAGNETIC RECORDING LAYER FORMED WITH A PREDETERMINED CONCAVO-CONVEX PATTERN

(75) Inventors: Mikiharu Hibi, Tokyo (JP); Kazuhiro Hattori, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 314 days.

(21) Appl. No.: 11/061,503

(22) Filed: Feb. 22, 2005

(65) Prior Publication Data
US 2005/0213239 A1    Sep. 29, 2005

(30) Foreign Application Priority Data
Feb. 26, 2004    (JP)    ............................. 2004-050816

(51) Int. Cl.
*G11B 5/82* (2006.01)
*G11B 5/64* (2006.01)

(52) U.S. Cl. ................. 360/135; 428/845.6; 428/848.2

(58) Field of Classification Search ................ 360/135, 360/131, 134, 136; 428/848.2, 845.5, 845.6, 428/847.7
See application file for complete search history.

(56) References Cited

U.S. PATENT DOCUMENTS

| | | | |
|---|---|---|---|
| 4,935,278 A | | 6/1990 | Krounbi et al. |
| 4,939,614 A | * | 7/1990 | Shirakura et al. ............ 360/135 |
| 5,082,709 A | * | 1/1992 | Suzuki et al. ............. 428/848.2 |
| 5,093,173 A | * | 3/1992 | Nakagawa et al. .......... 360/135 |
| 5,285,343 A | * | 2/1994 | Tanaka et al. ............... 360/135 |
| 5,576,918 A | * | 11/1996 | Bar-Gadda et al. .......... 360/135 |
| 5,626,941 A | * | 5/1997 | Ouano ...................... 428/848.2 |
| 5,680,285 A | * | 10/1997 | Nakamura et al. ........... 360/135 |
| 5,723,033 A | * | 3/1998 | Weiss .......................... 360/135 |
| 5,750,230 A | * | 5/1998 | Ishikawa et al. .......... 428/848.2 |
| 5,815,343 A | * | 9/1998 | Ishikawa et al. ............. 360/135 |
| 6,014,296 A | | 1/2000 | Ichihara et al. |
| 6,495,240 B1 | | 12/2002 | Wada et al. |
| 6,583,957 B1 | | 6/2003 | Takeshita et al. |
| 6,586,044 B1 | | 7/2003 | Takeshita et al. |

(Continued)

FOREIGN PATENT DOCUMENTS

CN        1164090 A        11/1997

(Continued)

*Primary Examiner*—Craig A. Renner
(74) *Attorney, Agent, or Firm*—Oblon, Spivak, McClelland, Maier & Neustadt, P.C.

(57) ABSTRACT

A magnetic recording medium including at least a disk substrate 1A, a magnetic recording layer 5 formed with a predetermined concavo-convex pattern on the disk substrate 1A, and a non-magnetic layer 6 filled into concave portions of the concavo-convex pattern, so as to have data track regions 20 and servo pattern regions 21. Due to the existence of concaves and convexes in the surface of each servo pattern region 21, the foregoing problem is solved. On this occasion, arithmetical mean deviation of the assessed profile Ra of the surface of each servo pattern region 21 is preferably not lower than 0.3 nm. The difference in surface level between each concave and each convex existing in the surface of the servo pattern region 21 is preferably not larger than 6 nm.

11 Claims, 7 Drawing Sheets

U.S. PATENT DOCUMENTS

| | | | |
|---|---|---|---|
| 6,628,598 B2 * | 9/2003 | Edwards et al. | 360/77.03 |
| 6,665,145 B2 | 12/2003 | Wada | |
| 2002/0068198 A1 * | 6/2002 | Kerfeld et al. | 428/848.1 |
| 2004/0174630 A1 * | 9/2004 | Nishihira | 360/135 |
| 2004/0174636 A1 * | 9/2004 | Suzuki et al. | 360/135 |
| 2004/0224119 A1 * | 11/2004 | Yamakage et al. | 428/64.2 |
| 2005/0036223 A1 * | 2/2005 | Wachenschwanz et al. | 360/135 |
| 2005/0086795 A1 * | 4/2005 | Suwa et al. | 29/603.01 |
| 2005/0134992 A1 * | 6/2005 | Homola et al. | 360/135 |
| 2005/0213239 A1 | 9/2005 | Hibi et al. | |
| 2006/0063042 A1 | 3/2006 | Takai et al. | |

FOREIGN PATENT DOCUMENTS

| | | |
|---|---|---|
| JP | 2-165416 | 6/1990 |
| JP | 5-22291(B) | 3/1993 |
| JP | 5-81808 | 4/1993 |
| JP | 7-210863 | 8/1995 |
| JP | 9-97419 | 4/1997 |
| JP | 2000-90432 | 3/2000 |
| JP | 2000-195042 | 4/2000 |
| JP | 2000-293843 | 10/2000 |
| JP | 2000-298822 | 10/2000 |
| JP | 2000-298823 | 10/2000 |
| JP | 2003-16621 | 1/2003 |
| WO | WO 03056555 A1 * | 7/2003 |

* cited by examiner

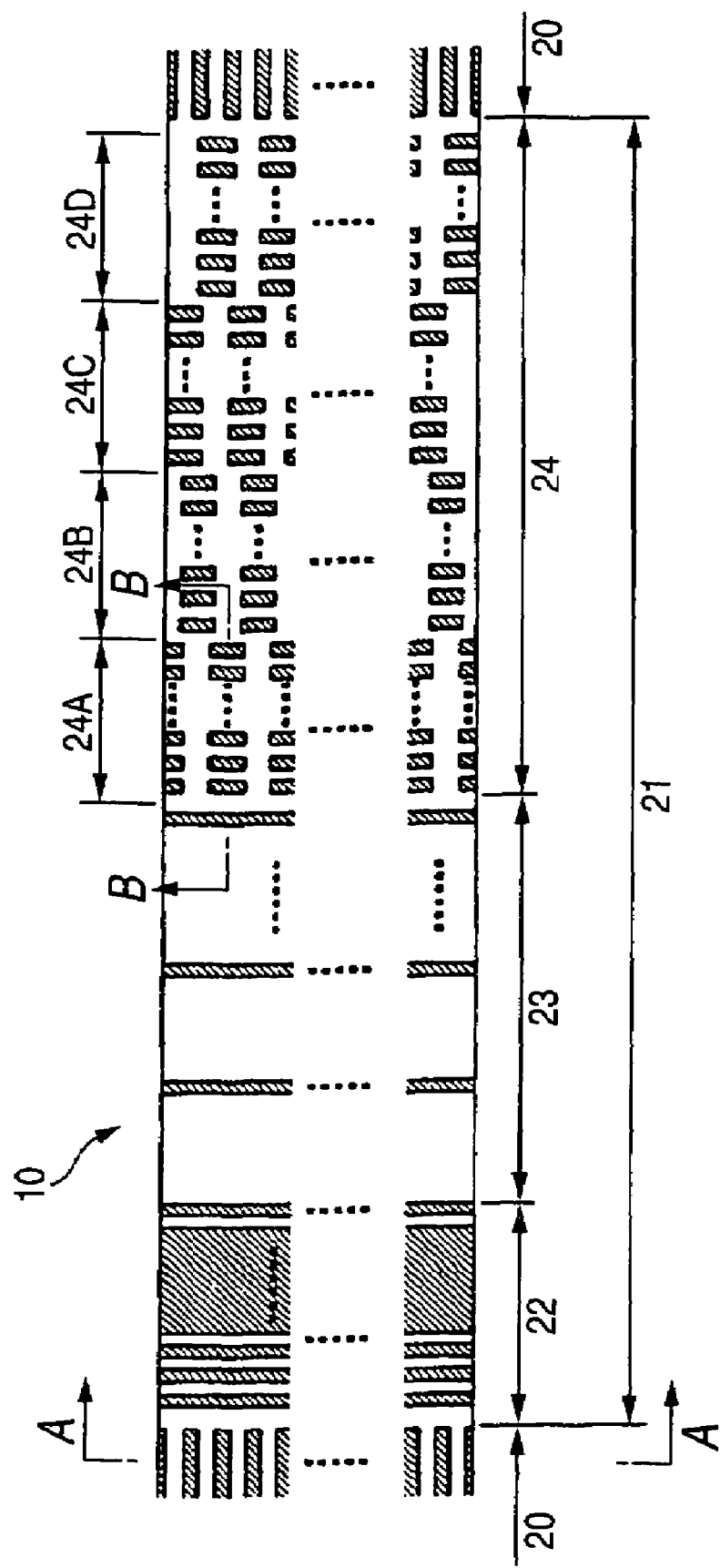

MAGNETIC RECORDING MEDIUM AND MAGNETIC RECORDING AND REPRODUCING DEVICE USING A MAGNETIC RECORDING LAYER FORMED WITH A PREDETERMINED CONCAVO-CONVEX PATTERN

BACKGROUND OF THE INVENTION

The present invention relates to a magnetic recording medium and magnetic recording-reproducing device, and particularly relates to a magnetic recording medium in which stiction between the magnetic recording medium and a head slider flying on the surface of the magnetic recording medium and mounted with a magnetic head for recording and reproducing information into/from the magnetic recording medium is prevented effectively so that crush or the like due to the stiction can be prevented, and magnetic recording-reproducing device having the magnetic recording medium.

Magnetic recording media such as hard disks have been conspicuously improved in areal density by improved techniques such as finer granulation of magnetic particles for forming magnetic recording layers, alteration of materials, and finer head processing. Further improvement in areal density will be expected in the future. However, the improved techniques adopted till now have elicited problems as to side fringes, crosstalk, etc. due to a limit of head processing and a spread of a magnetic field. Thus, the improvement in areal density using the background-art techniques has reached its limit.

As one of solutions to the problems, that is, as one of techniques which can improve the areal density of magnetic recording media, there have been proposed discrete track type magnetic recording media (for example, see JP-A-9-97419 or JP-A-2000-195042). A typical discrete track type magnetic recording medium has a magnetic recording layer formed with concentric track patterns, and a non-magnetic layer filled into concave portions between adjacent ones of the magnetic recording layer patterns so as to extend continuously in the track direction and separate the concentric track patterns from each other.

In magnetic recording-reproducing device having such a discrete track type magnetic recording medium, servo pattern regions serving as reference of tracking control for controlling a magnetic head to track on a desired track are formed all over the 360° circumference of the magnetic recording medium and, for example, at fixed angular intervals between adjacent ones of data track regions.

FIG. 2 is a schematic configuration diagram showing an example of a servo pattern region formed in a discrete track type magnetic recording medium. Servo pattern regions 21 are formed all over the 360° circumference of the magnetic recording medium and at fixed angular intervals between data track regions 20 and 20 adjacent to each other. Each servo pattern region 21 is chiefly constituted by a sync signal region (preamble region) 22, an address region 23 and a servo burst signal region 24. The sync signal region 22 serves to fix the reproduced waveform amplitude by means of an AGC circuit or to secure synchronization with a clock. The address region 23 includes a timing signal indicating the start position of a sector and serving as a reference position of each data track region 20, and an index identification signal. The servo burst signal region 24 serves to generate a position signal indicating a position in a track. Incidentally, the address region 23 includes a track number identification function for identifying the number of a track arranged in the radial direction of the disk and a sector number identification function for identifying the number of a servo pattern arranged in the circumferential direction of the disk.

The servo burst signal region 24 is a two-phase servo system typically constituted by four burst signal regions 24A, 24B, 24C and 24D. Amplitude differences between burst signals are calculated based on the pair of the first and second burst signal regions 24A and 24B and the pair of the third and fourth burst signal regions 24C and 24D. Thus, of the amplitude differences, portions high in linearity are connected to obtain a linear position error signal. Such servo pattern regions 21 serve as reference for the magnetic head to accurately trace tracks formed in the magnetic recording medium. Thus, high positioning accuracy is required for forming the servo pattern regions 21.

In manufacturing of a discrete track type magnetic recording medium having servo pattern regions and data track regions, a non-magnetic material is filled into concave portions of a predetermined concavo-convex pattern with which a magnetic recording layer is formed. Thus, the surface is made flat enough to suppress fluctuation in flying of a head slider mounted with a magnetic head. As a method of charging thus, a film formation technique such as sputtering to be used in the field of semiconductor manufacturing is used. However, when the film formation technique is used, the non-magnetic material is formed not only in the aforementioned concave portions but also on the upper surface of the magnetic recording layer. Thus, irregularities in high relief caused by the non-magnetic material formed as a layer on the magnetic recording layer are formed in the surface of the magnetic recording medium. Due to the irregularities in high relief, there occur problems as follows. That is, the flying height of the head slider mounted with the magnetic head and flying due to an air flow on the surface of the magnetic recording medium rotating at the time of recording-reproducing is made unstable, or the gap length between the magnetic head and the magnetic recording layer is increased (that is, the spacing loss between the magnetic head and the magnetic recording layer). Thus, the sensitivity is lowered or foreign matters are accumulated easily.

As a solution to the aforementioned problems, it is desired to flatten the surface of the magnetic recording layer while removing the non-magnetic material formed as a layer on the magnetic recording layer. A processing technique such as CMP (Chemical Mechanical Polishing), for example, used in the field of semiconductor manufacturing is used as such a flattening method. Typically a texture is formed in the surface of a magnetic recording medium so that stiction between the head slider and the magnetic recording medium is prevented by the effect of the texture. When the aforementioned CMP method or the like is used to make the surface of the magnetic recording medium too flat, the effect of the texture is not exerted sufficiency. Thus, there is a problem that the head slider is stuck onto the magnetic recording medium so that the magnetic head is crushed easily.

Particularly, with increase in areal density, the flying height of the head slider may be not higher than 10 nm. In such a case, the head slider and the magnetic recording medium are brought into intermittent contact with each other. In this state, when the surface of the magnetic recording medium is too flat, there is a problem that friction between the head slider and the magnetic recording medium increases so that the magnetic head is crushed easily for the same reason as mentioned above.

JP-A-2000-195042 proposes a solution to such a problem, in which a texture is formed in the flattened surface of a non-magnetic material, and stiction between a head slider and a magnetic recording medium is prevented by irregularities of the texture so as to prevent crush from occurring.

Although the magnetic recording medium disclosed in JP-A-2000-195042 has some effect in preventing the stiction of the head slider, it is necessary to add a step of forming a texture in the flattened surface of the non-magnetic material. Thus, there is a problem that the number of steps in the manufacturing process increases so as to increase the cost. In addition, in the magnetic recording medium manufactured thus, the flattened non-magnetic material remains on the surface of the magnetic recording layer. Thus, there is a problem that the gap length (synonymous with "spacing loss": the same thing will be applied below) between the magnetic recording layer formed in the magnetic recording medium and the magnetic head is increased.

SUMMARY OF THE INVENTION

The present invention was developed to solve the foregoing problems. It is a first object of the invention to provide a magnetic recording medium having a structure which has an effect of preventing stiction of a head slider, and which is preferably low in spacing loss and superior in cost merit. It is a second object of the invention to provide magnetic recording-reproducing device having the magnetic recording medium.

In order to attain the foregoing first object, a magnetic recording medium according to the invention at least includes a disk substrate, a magnetic recording layer formed with a predetermined concavo-convex pattern on the disk substrate, and a non-magnetic layer filled into concave portions of the concavo-convex pattern, wherein the magnetic recording medium has data track regions and servo pattern regions. The magnetic recording medium is characterized in that concaves and convexes exist in a surface of each of the servo pattern regions.

According to the invention, in a hard disk drive or the like provided with the magnetic recording medium having the concaves and convexes in the surface of each servo pattern region forming the magnetic recording medium, the effect of preventing stiction of a head slider flying on the magnetic recording medium and reading/writing magnetic recording information can be improved due to the existence of the concaves and convexes. As a result, the hard disk drive or the like can be driven stably.

The magnetic recording medium according to the invention may be also characterized in that arithmetical mean deviation of the assessed profile of a surface of each of the servo pattern regions is not lower than 0.3 nm.

According to the invention, in a hard disk drive or the like provided with the magnetic recording medium not lower than 0.3 nm in arithmetical mean deviation of the assessed profile of a surface of each of the servo pattern regions, the surface of the magnetic recording medium is prevented from being too flat due to the arithmetical mean deviation of the assessed profile of the surface. Thus, increase in friction resistance between the magnetic recording medium and a head slider can be suppressed. As a result, it is possible to prevent stiction between the magnetic recording medium and the head slider flying on the magnetic recording medium and mounted with a magnetic head for reading/writing magnetic recording information.

The magnetic recording medium according to the invention may be also characterized in that a difference in surface level between each of the concaves and each of the convexes existing in a surface of each of the servo pattern regions is not higher than 6 nm.

According to the invention, due to the difference in surface level between each concave and each convex existing in a surface of each of the servo pattern regions, which difference is not higher than 6 nm, the effect of preventing stiction can be improved without lowering the flying stability of the head slider flying on the magnetic recording medium.

The magnetic recording medium according to the invention may be also characterized in that the concaves and convexes existing in a surface of each of the servo pattern regions are formed by a difference in surface level between the magnetic recording layer and the non-magnetic layer, and a thickness-direction surface position of the magnetic recording layer is higher than a thickness-direction surface position of the non-magnetic layer in each of the servo pattern regions.

According to the invention, the concaves and convexes existing in a surface of each of the servo pattern regions are formed by the difference in surface level between the magnetic recording layer and the non-magnetic layer, and the thickness-direction surface position of the magnetic recording layer is higher than a thickness-direction surface position of the non-magnetic layer in each servo pattern region. Accordingly, the distance between the magnetic recording layer and the magnetic head can be narrowed to reduce the spacing loss between the both.

The magnetic recording medium according to the invention may be also characterized in that the thickness-direction surface position of the non-magnetic layer is not higher than the thickness-direction surface position of the magnetic recording layer.

According to the invention, the thickness-direction surface position of the non-magnetic layer is not higher than the thickness-direction surface position of the magnetic recording layer in each data track region and each servo pattern region. Accordingly, the magnetic recording layer is exposed sufficiently. As a result, the distance between the magnetic recording layer and the magnetic head can be narrowed to reduce the spacing loss between the both.

The magnetic recording medium according to the invention may be also characterized in that arithmetical mean deviation of the assessed profile of a surface of each of the data track regions is lower than arithmetical mean deviation of the assessed profile of a surface of each of the servo pattern regions.

According to the invention, due to the arithmetical mean deviation of the assessed profile of a surface of each of the data track regions lower than the arithmetical mean deviation of the assessed profile of a surface of each of the servo pattern regions, the S/N ratio of reproduced data in each data track region can be more improved.

The magnetic recording medium according to the invention may be also characterized in that the magnetic recording layer is absent from the concave portions of the concavo-convex pattern.

According to the invention, due to the absence of the magnetic recording layer in the concave portions of the concavo-convex pattern, the problem of noise generated from the concave portions can be eliminated.

The magnetic recording medium according to the invention may be also characterized in that a non-magnetic material for forming the non-magnetic layer is comprised of one or more compounds selected from oxides, nitrides and carbides.

According to the invention, the non-magnetic material for forming the non-magnetic layer is comprised of one or more compounds selected from oxides, nitrides and carbides.

Accordingly, those compounds are excellent in chemical stability in themselves and difficult to allow corrosion or the like to occur, for example, due to contact with the magnetic recording layer having a metal component. As a result, it is possible to provide a magnetic recording medium excellent in chemical stability.

The magnetic recording medium according to the invention may be also characterized in that a non-magnetic material for forming the non-magnetic layer is a material having an amorphous structure or a microcrystalline material.

Normally, the concave portions to be filled with the non-magnetic layer are formed by etching the magnetic recording layer. The groove flanks of the concave portions are considerably damaged by the etching so that defects such as grain boundaries are produced. Such defects cannot be protected perfectly by a normal crystalline material having grain boundaries. According to the invention, such defects can be protected by use of a non-magnetic material which is a material having an amorphous structure or a microcrystalline material as a filling material. Incidentally, the microcrystalline material means a material having no crystalline peak in X-ray diffraction.

The magnetic recording medium according to the invention may be also characterized in that a non-magnetic material for forming the non-magnetic layer has silicon dioxide as a main component thereof.

According to the invention, due to use of a non-magnetic material having silicon dioxide as its main component, which material is easy to be etched, good flatness can be obtained particularly in each data track region. In addition, it is possible to form a non-magnetic layer superior in adhesion to the magnetic recording layer and suppressed in crystal grain growth.

In order to attain the second object, magnetic recording-reproducing device according to the invention is characterized by including a magnetic recording medium according to the invention, a head slider designed to at least partially fly on a surface of the magnetic recording medium at the time of recording-reproducing, and a magnetic head mounted on the head slider and for recording-reproducing information into/from the magnetic recording medium.

According to the invention, the magnetic recording-reproducing device is provided with the magnetic recording medium having a structure which has an effect of preventing stiction of the head slider and which is low in spacing loss and superior in cost merit. Accordingly, the head slider flying on the magnetic recording medium configured thus can fly stably without producing crush due to the stiction on the magnetic recording medium. As a result, it is possible to provide magnetic recording-reproducing device which can be driven stably.

The magnetic recording-reproducing device according to the invention may be also characterized in that circumferentially continuous length of each of the data track regions in the magnetic recording medium is not longer than circumferential length of the head slider.

According to the invention, due to the circumferentially continuous length of each data track region in the magnetic recording medium not longer than the circumferential length of the head slider, at least a part of head slider is always present in a servo pattern region having the concaves and convexes. As a result, stiction of the head slider can be prevented more surely.

Incidentally, in the specification, "a magnetic recording layer formed with a predetermined concavo-convex pattern on a disk substrate" implies not only a magnetic recording layer divided into a large number of recording elements with a predetermined pattern on a disk substrate, but also a magnetic recording layer partially divided but partially connected, a magnetic recording layer such as a spiral magnetic recording layer formed continuously in a part of a substrate, and a continuous magnetic recording layer having a concavo-convex pattern in which both convex portions and concave portions are formed. Further, in the specification, "convex portions of a concavo-convex pattern" means protruding portions of a concavo-convex shape in a section perpendicular to the surface.

As described above, according to the magnetic recording medium of the invention, the surface of the magnetic recording medium is prevented from being too flat, so that increase in frictional resistance between the magnetic recording medium and a head slider can be suppressed. Accordingly, it is possible to prevent stiction between the magnetic recording medium according to the invention and the head slider flying on the magnetic recording medium and mounted with a magnetic head for reading/writing magnetic recording information. Thus, problems such as crush of the magnetic head due to the stiction can be suppressed conspicuously. In addition, it is not necessary to add a step of giving a texture to the surface of the magnetic recording medium. Thus, the cost can be reduced. In addition, the distance between the magnetic recording layer formed in the magnetic recording medium and the magnetic head is so small that the spacing loss can be reduced. Further, it is not necessary to give a texture to each data track region. Thus, the irregularities in the data track region can be suppressed to be so small that the S/N ratio of reproduced data in the data track region can be improved.

In addition, the magnetic recording-reproducing device of the invention is provided with the aforementioned magnetic recording medium. Accordingly, it is possible to prevent stiction between the magnetic recording medium and the head slider flying on the magnetic recording medium and mounted with a magnetic head for reading/writing magnetic recording information. Thus, it is possible to provide magnetic recording-reproducing device which can conspicuously suppress problems such as crush of the magnetic head due to the stiction, and which is low in spacing loss between the magnetic head and the magnetic recording layer, and excellent in cost merit.

BRIEF DESCRIPTION OF THE DRAWINGS

FIG. 2 is a schematic plan view of each data track region and each servo pattern region in a magnetic recording medium according to the invention;

DETAILED DESCRIPTION OF THE PREFERRED EMBODIMENTS

Detailed description will be made below about a magnetic recording medium according to the invention and magnetic recording-reproducing device having the magnetic recording medium.

(Magnetic Recording Medium)

Magnetic recording media according to the invention include hard disks, floppy (registered trademark) disks, magnetic tapes, etc. using only magnetism for recording and reading information. However, the magnetic recording media according to the invention are not limited to those media, but also include magneto-optical recording media such as MO (Magnet Optical) disks using both magnetism and light, and thermally assisted recording media using both magnetism and heat. For example, the magnetic recording media can be represented by a magnetic recording medium (see FIG. 2 which will be described later) in which servo pattern regions serving as reference of tracking control for controlling a recording-reproducing head such as a magnetic head to track on a desired track are formed all over the 360° circumference of the magnetic recording medium at fixed angular intervals between data track regions.

Figure 1A:
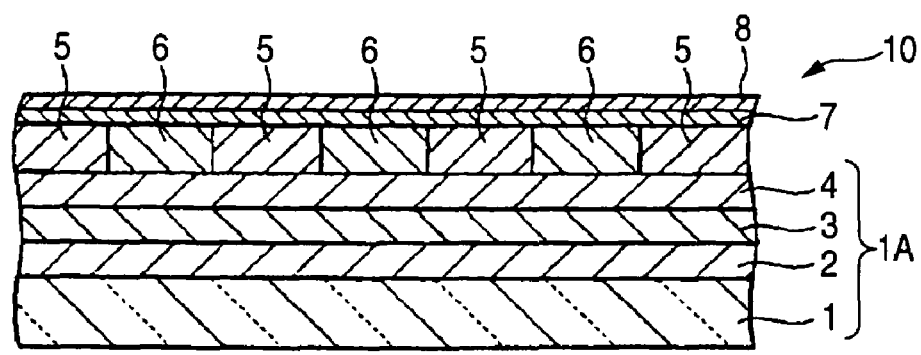
FIGS. 1A-1B are schematic sectional views showing layer configurations of magnetic recording media according to the invention.
Figure 1B:
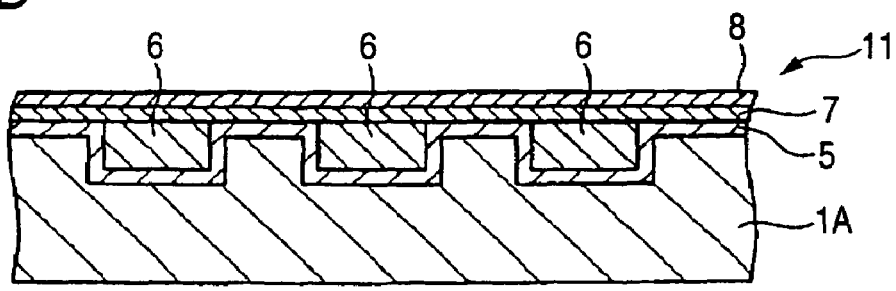

FIGS. 1A and 1B are sectional configuration diagrams showing an example of a fundamental sectional mode of a magnetic recording medium according to the invention.

The magnetic recording medium according to the invention shown in FIGS. 1A and 1B is a perpendicular recording type magnetic recording medium having a soft magnetic layer. The magnetic recording medium includes at least a disk substrate 1, a magnetic recording layer 5 formed with a predetermined concavo-convex pattern on the disk substrate 1, and a non-magnetic layer 6 filled into concave portions of the concavo-convex pattern. More specifically, for example, an undercoat layer 2, a soft magnetic layer 3 and an orientation layer 4 are laminated onto the disk substrate 1 in turn. Further on the orientation layer 4, a magnetic recording layer 5 is formed with a predetermined concavo-convex pattern, and a non-magnetic layer 6 is filled into concave portions of the concavo-convex pattern. Further a protective film 7 and a lubricating film 8 are formed to cover the magnetic recording layer 5 and the non-magnetic layer 6.

Incidentally, in FIGS. 1A and 1B, the reference numeral 1A represents a disk substrate which expediently designates a total laminate of the undercoat layer 2, the soft magnetic layer 3 and the orientation layer 4 laminated onto the disk substrate 1 successively. FIG. 1A shows a sectional mode of a magnetic recording medium 10 in which there is no magnetic recording layer between elements of a magnetic recording layer 5 formed with a predetermined concavo-convex pattern on the disk substrate 1A. FIG. 1B shows a sectional mode of a magnetic recording medium 11 (referred to as "palm type") in which concaves and convexes are formed in the disk substrate 1A, and a magnetic recording layer 5 is formed thereon as a film following the concaves and convexes. The following description will be made chiefly based on FIG. 1A about the perpendicular recording type magnetic recording medium 10 having the soft magnetic layer 3. However, the magnetic recording medium according to the invention may be a longitudinal recording type magnetic recording medium, or may be a magnetic recording medium 11 in which a magnetic recording layer is present in concave portions of a concavo-convex pattern as shown in FIG. 1B.

First, description will be made about each layer constituting the magnetic recording medium according to the invention.

The disk substrate 1 must be extremely smooth and have no undulation or the like. Thus, a head slider flying on the magnetic recording medium formed finally can fly in low height. A glass substrate, an NiP-plated Al—Mg alloy substrate or the like is preferably used as the disk substrate 1. The thickness of the disk substrate 1 to be used is, for example, about 300-700 μm. Particularly, the glass substrate is lower in surface roughness than the NiP-plated Al—Mg alloy substrate. Thus, the glass substrate can gain high surface smoothness. In addition, the glass substrate is also superior in shock resistance. Therefore, the glass substrate is preferably used in a small-size magnetic recording medium.

The undercoat layer 2 is provided for controlling the orientation of the soft magnetic layer 3 formed thereon, and so on. The soft magnetic layer 3 is provided for forming a magnetic circuit between a magnetic head and the magnetic recording medium, and so on. The orientation layer 4 is provided for controlling the orientation of the magnetic recording layer 5 formed thereon, and so on.

The magnetic recording layer 5 is provided with a predetermined pattern as a magnetic recording layer in a hard disk drive or the like. For example, in a discrete track type magnetic recording medium, in each data track region constituting the magnetic recording medium, a magnetic recording layer is formed so that elements thereof are arranged at very small intervals in the radial direction of tracks by a concentric pattern in order to record/reproduce magnetic recording information. On the other hand, in each servo pattern region, the magnetic recording layer is formed as a pattern to be used as reference of tracking control for making the magnetic head track on a desired data track. In addition, for example, in a discrete bit type magnetic recording medium, in each data track region constituting the magnetic recording medium, a magnetic recording layer is formed so that elements thereof are arranged at very small intervals in the circumferential direction and the radial direction of tracks by a dot pattern. On the other hand, in each servo pattern region constituting the magnetic recording medium, the magnetic recording layer is formed with a pattern corresponding to predetermined servo information or the like. Preferred examples of materials for forming the magnetic recording layer 5 include Co—Cr-based polygenetic alloys such as CoCrTa, CoCrPt, CoCrPtTa, etc. The magnetic recording layer 5 is formed to be 5-30 nm in thickness, 5-1,000 nm in convex width and 10-2,000 nm in pattern pitch by a film formation method such as a sputtering method, and an etching method.

The non-magnetic layer 6 is a layer filled into each concave portion of the concavo-convex pattern formed on the disk substrate. Examples of non-magnetic materials for forming the non-magnetic layer 6 include $SiO_2$ (silicon dioxide), In (indium), ITO (tin-doped indium oxide), $Al_2O_3$, TiN, TaSi alloys, Ta, MgO, SiC, TiC, etc. The non-magnetic layer 6 is formed to be, for example, 5-30 nm thick by a film formation method such as a sputtering method.

According to the invention, it is preferable to select, from the aforementioned various non-magnetic materials, one or more compounds of oxides ($SiO_2$, ITO, $Al_2O_3$, MgO, etc.), nitrides (TiN etc.) and carbides (SiC, TiC, etc.). These compounds are excellent in chemical stability in themselves and difficult to allow corrosion or the like to occur, for example, due to contact with the magnetic recording layer 5 having a metal component. Thus, the compounds can provide magnetic recording media excellent in chemical stability. According to the invention, particularly a non-magnetic material having $SiO_2$ as its primary component is preferably used. $SiO_2$ is processed by etching so easily that good flatness can be obtained particularly in each data track region by etching. In addition, $SiO_2$ is superior in adhesion to the magnetic recording layer 5 and also has an effect that it can form the non-magnetic layer 6 suppressed in crystal grain growth.

Alternatively, non-magnetic materials which are materials having an amorphous structure or microcrystalline materials may be used preferably as the non-magnetic layer 6. Typically the concave portions to be filled with the non-magnetic layer 6 are formed by etching the magnetic recording layer 5. The groove flanks of the concave portions are considerably damaged by the etching so that defects such as grain boundaries are produced. Such defects cannot be protected perfectly by a normal crystalline material having grain boundaries. Therefore, the defects such as grain boundaries damaged by the etching can be protected by use of a material having an amorphous structure with no grain boundaries or a microcrystalline material having grain boundaries substantially counting for nothing, as the material to be filled. Specific examples of non-magnetic materials having an amorphous structure include C, Si, $SiO_2$, $Al_2O_3$, TaSi alloys, TbFeCo alloys, CoZr alloys, etc. The non-magnetic layer 6 is formed to be, for example, 5-30 nm thick by a film formation method such as a sputtering method. Incidentally, the microcrystalline materials designate materials having no crystalline peak in X-ray diffraction.

The protective layer 7 is provided for protecting the surface of the magnetic recording medium so as to secure the sliding durability thereof in cooperation with the lubricating layer 8 which will be described later. Particularly, the protective layer 7 is provided for preventing the magnetic recording medium from being damaged at the time of contact with the head slider. Examples of materials for forming the protective layer 7 include a hard carbon film called diamond-like carbon (hereinafter referred to as "DLC"), zirconium oxide ($ZrO_2$), silicon dioxide ($SiO_2$), etc. The protective layer 7 is formed to be 1-5 nm thick by a film formation method such as a CVD (Chemical Vapor Deposition) method or a sputtering method. Incidentally, the DLC is an amorphous structure film having carbon as its primary component, and it is a carbonaceous material showing hardness of about 200-8,000 $kgf/mm^2$ by Vickers hardness measurement.

The lubricating layer 8 is provided for protecting the surface of the magnetic recording medium so as to secure the sliding durability thereof in cooperation with the aforementioned protective layer 7. Preferred examples of materials for forming the lubricating layer 8 include liquid fluorine-based compounds such as perfluoropolyether (PFPE). The lubricating layer 8 is formed to be 1-2 nm thick by a film forming method such as a dipping method.

FIG. 2 is a schematic configuration diagram showing an example of data track regions and servo pattern regions formed in a magnetic recording medium according to the invention. FIGS. 3A-3B, 4A-4B and 5A-5B are schematic sectional views showing examples of magnetic recording media according to first to third embodiments. Incidentally, in FIG. 2, the hatched portions designate concave portions of a concavo-convex pattern, and the other portions designate convex portions of the concavo-convex pattern. FIGS. 3A-5A are sectional views taken on line A-A in FIG. 2, showing a data track region. FIGS. 3B-5B are sectional views taken on line B-B in FIG. 2, showing a servo pattern region. In FIGS. 3A-3B, 4A-4B and 5A-5B, in order to elicit the features of the invention, a laminate comprised of a disk substrate 1, an undercoat layer 2, a soft magnetic layer 3 and an orientation layer 4 is designated by a "disk substrate 1A", and a protective layer 7 and a lubricating layer 8 provided on the magnetic recording layer 5 and the non-magnetic layer 6 are not illustrated.

As shown in FIG. 2, a magnetic recording medium according to the invention includes data track regions 20 and servo pattern regions 21. In each data track region 20, a magnetic recording layer for recording-reproducing magnetic recording information is formed like a track. Each servo pattern region 21 serves as reference of tracking control for making a magnetic head track on a desired data track.

The servo pattern regions 21 are formed all over the 360° circumference of the magnetic recording medium at fixed angular intervals between the data track regions 20 and 20. Each servo pattern region 21 is chiefly constituted by a sync signal region (preamble region) 22, an address region 23 and a servo burst signal region 24. The sync signal region 22 serves to fix the reproduced waveform amplitude by means of an AGC circuit or to secure synchronization with a clock. The address region 23 includes a timing signal indicating the start position of a sector and serving as a reference position of a data track region 20, and an index identification signal. The servo burst signal region 24 serves to generate a position signal indicating a position in a track. Incidentally, the address region 23 includes a track number identification function for identifying the number of a track arranged in the radial direction of the disk and a sector number identification function for identifying the number of a servo pattern arranged in the circumferential direction of the disk.

The servo burst signal region 24 is a two-phase servo system typically constituted by four burst signal regions 24A, 24B, 24C and 24D. Amplitude differences between burst signals are calculated based on the pair of the first and second burst signal regions 24A and 24B and the pair of the third and fourth burst signal regions 24C and 24D. Thus, of the amplitude differences, portions high in linearity are connected to obtain a linear position error signal. Such servo pattern regions 21 serve as reference for the magnetic head to accurately trace tracks formed in the magnetic recording medium. Thus, high positioning accuracy is required for forming the servo pattern regions 21.

Figure 3A:
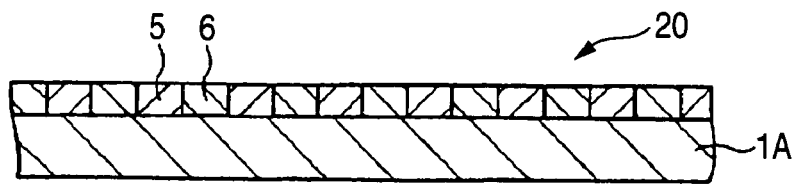
FIGS. 3A-3B are schematic sectional views showing an embodiment of the magnetic recording medium according to the invention.
Figure 3B:
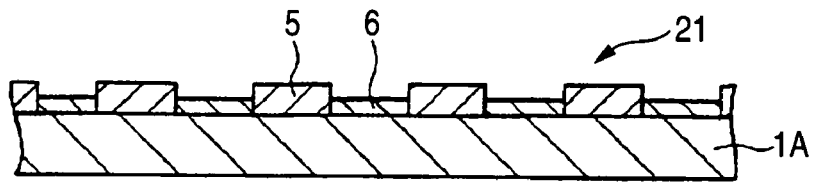
Figure 4A:
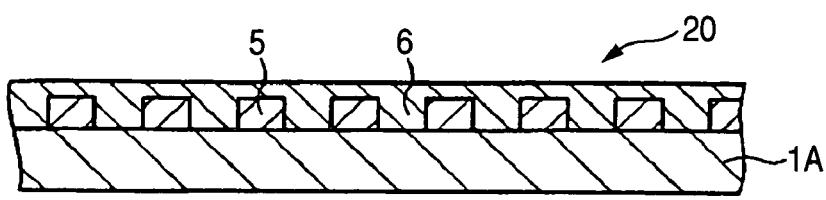
FIGS. 4A-4B are schematic sectional views showing another embodiment of the magnetic recording medium according to the invention.
Figure 4B:
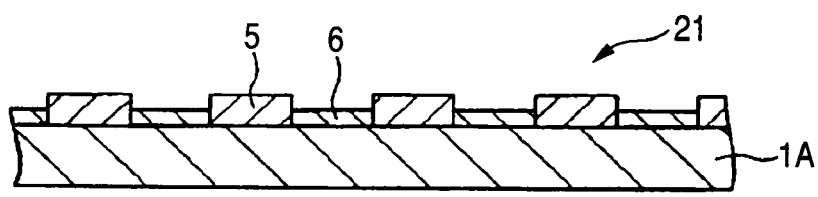
Figure 5A:
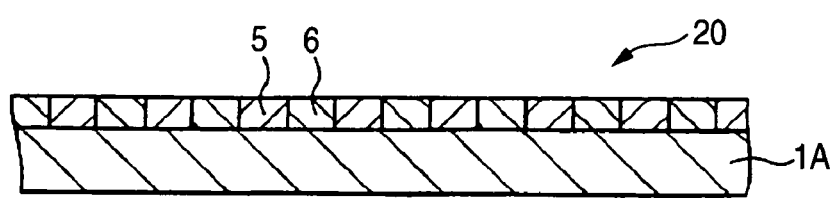
FIGS. 5A-5B are schematic sectional views showing another embodiment of the magnetic recording medium according to the invention.
Figure 5B:
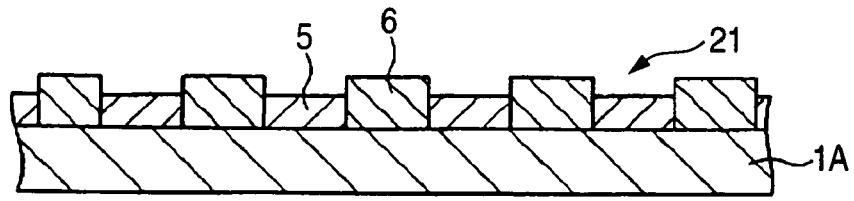

In the magnetic recording medium 10 according to the invention is first characterized in that there are concaves and convexes in the surface of each servo pattern region 21 as shown in FIGS. 3B, 4B and 5B. Due to the existence of the concaves and convexes in the surface of each servo pattern region 21, the effect of preventing stiction of a head slider flying on the magnetic recording medium and reading/writing magnetic recording information can be improved in a hard disk drive or the like provided with the magnetic recording medium having the concaves and convexes. As a result, the hard disk drive or the like can be driven stably.

The concaves and convexes existing in the surface of each servo pattern region 21 are formed by a difference in surface level between the magnetic recording layer 5 and the non-magnetic layer 6 as shown in FIGS. 3B, 4B and 5B. Of these embodiments, as shown in FIGS. 3B and 4B, it is preferable that the thickness-direction position of the surface of the magnetic recording layer 5 is higher than the thickness-direction position of the surface of the non-magnetic layer 6 in each servo pattern region 21. In magnetic recording media according to the embodiments, the distance between the magnetic recording layer and a magnetic head can be narrowed so that the spacing loss between the both can be reduced. As shown in FIG. 5B, the thickness-direction position of the surface of the non-magnetic layer 6 may be made higher than the thickness-direction position of the surface of the magnetic layer 5 in each servo pattern region 21. In this case, the magnetic recording medium can be designed to improve at least the effect of preventing stiction of the head slider.

It is desired that the concaves and convexes existing in the surface of each servo pattern region 21 have a difference in surface level not larger than 6 nm. Within this range, the effect of preventing the stiction can be improved without lowering the flying stability of the head slider flying on the magnetic recording medium. On the other hand, when the concaves and convexes have a difference in surface level larger than 6 nm, the flying stability of the head slider may deteriorate to cause a practical problem. Further, from the point of view of the reproduced signal quality of servo information, the difference in surface level is preferably not larger than 3 nm, and more preferably not larger than 1 nm. Incidentally, the difference in surface level was measured by an atomic force microscope.

Particularly in the magnetic recording medium according to the invention, the embodiment as shown in FIGS. 3A-3B is preferred. That is, the non-magnetic layer 6 is absent from the surface of the magnetic recording layer 5 in each data track region 20, and the magnetic recording layer 5 in each servo pattern region 21 forms convex portions of a concavo-convex pattern. According to this embodiment configured thus, the non-magnetic layer 6 is not formed to cover the surface of the magnetic recording layer 5 in either the data track region 20 or the servo pattern region 21. That is, the thickness-direction surface position of the non-magnetic layer 6 is not higher than the thickness-direction surface position of the magnetic recording layer 5, and the non-magnetic layer 6 is chiefly present in the concave portions of the concavo-convex pattern. Thus, the magnetic recording layer 5 is exposed sufficiently. As a result, the distance between the magnetic recording layer and the magnetic head can be reduced so that the spacing loss between the both can be reduced.

In the magnetic recording medium according to the embodiment shown in FIGS. 4A-4B, the non-magnetic layer 6 is formed on the magnetic recording layer 5 in each data track region 20. Accordingly, it is likely that there occurs a problem of the spacing loss due to the non-magnetic layer 6. However, when the non-magnetic layer 6 formed on the magnetic recording layer 5 is not thicker than 1 nm, the spacing loss becomes small not to result in any practical problem.

On the other hand, when convex portions in each servo pattern region 21 are formed by the non-magnetic layer 6 as in the magnetic recording medium shown in FIGS. 5A-5B, there is an effect in terms of prevention of stiction of the head slider. However, the non-magnetic layer 6 is formed to be higher (thicker) in thickness-direction surface position than the magnetic recording layer 5. Thus, there occurs a spacing loss between the magnetic head and the magnetic recording layer in accordance with the distance by which the non-magnetic layer 6 is formed to be higher (thicker) than the magnetic recording layer 5. As a result, the gap length between the head slider flying on the magnetic recording medium and the magnetic recording layer formed on the magnetic recording medium increases so that the sensitivity may deteriorate. Incidentally, when the difference in surface level between the magnetic recording layer 5 and the non-magnetic layer 6 is not larger than 1 nm in the magnetic recording medium according to the embodiment shown in FIGS. 5A-5B in the same manner as described above, the spacing loss becomes small not to result in any practical problem.

In addition, in the magnetic recording media according to the embodiments shown in FIGS. 3A-3B, 4A-4B and 5A-5B, the magnetic recording layer 5 is absent from the concave portions of the concavo-convex pattern. Accordingly, there is an effect that the problem of noise generated from the concave portions can be eliminated.

Figure 11:
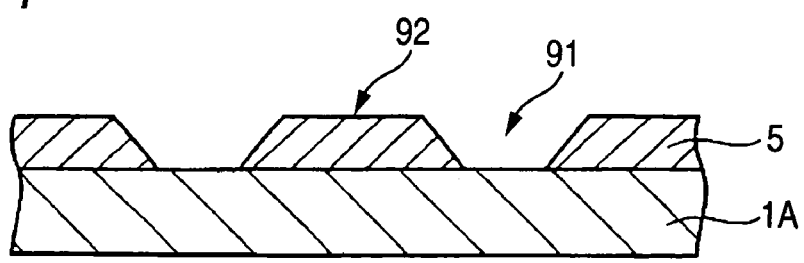
FIG. 11 is a schematic view for explaining the range of a convex portion of a concavo-convex pattern.

Incidentally, in this specification, the "convex portions of the concavo-convex pattern" means protruding portions of a concavo-convex shape in a section perpendicular to the surface. Further, assume that each convex portion 92 of the concavo-convex pattern in this specification includes a tapered portion when a tapered angle as shown in FIG. 11 is present in the convex portion 92.

The magnetic recording medium according to the invention is secondly characterized in that arithmetical mean deviation of the assessed profile Ra of the surface of each servo pattern region 21 is not lower than 0.3 nm, and preferably not lower than 0.5 nm. In a hard disk drive or the like provided with the magnetic recording medium having such an arithmetical mean deviation of the assessed profile of the surface, the surface of the magnetic recording medium is not too flat, so that it is possible to suppress increase in frictional resistance between the magnetic recording medium and a head slider. As a result, it is possible to prevent stiction between the magnetic recording medium and the head slider flying thereon for reading/writing magnetic recording information, so that there hardly occurs a problem such as crush of a magnetic head due to the stiction. Incidentally, the arithmetical mean deviation of the assessed profile Ra is defined as JIS-B0601-2001.

Here, the arithmetical mean deviation of the assessed profile of the surface of each servo pattern region 21 means arithmetical mean deviation of the assessed profile of the surface including concaves and convexes (for example, difference in surface level between the magnetic recording layer 5 and the non-magnetic layer 6) existing in the surface of the servo pattern region 21 as shown in FIGS. 3A-3B, 4A-4B and 5A-5B by way of example. Due to the arithmetical mean deviation of the assessed profile of the surface not lower than 0.3 nm, stiction between the magnetic recording medium and the head slider is prevented so that crush of the magnetic head caused by the stiction can be eliminated. If the arithmetical mean deviation of the assessed profile of the surface is lower than 0.3 nm, the surface of each servo pattern region 21 will be so flat that the frictional resistance between the magnetic recording medium and the head slider increases. As a result, stiction between the magnetic recording medium and the head slider will occur easily.

On the other hand, according to the invention, concaves and convexes as in each servo pattern region 21 are absent from each data track region 20. Accordingly, the arithmetical mean deviation of the assessed profile of the surface of the data track region 20 is lower than the arithmetical mean deviation of the assessed profile of the surface of the servo pattern region 21. Thus, there is an effect that the S/N ratio of reproduced data in the data track region 20 can be improved more. In terms of the S/N ratio, the arithmetical mean deviation of the assessed profile Ra of the surface of the data track region 20 is preferably not higher than 1 nm and more preferably not higher than 0.5 nm. If the arithmetical mean deviation of the assessed profile Ra of the surface of the data track region 20 is higher than 1 nm, the S/N ratio may be reduced to increase servo tracking errors. Incidentally, the method of measuring the arithmetical mean deviation of the assessed profile of the surface in the data track region 20 is similar to the aforementioned method in the servo pattern region 21.

According to the magnetic recording medium of the invention, as described above, the surface of the magnetic recording medium is not too flat, so that increase in frictional resistance between the magnetic recording medium and the head slider can be suppressed. Accordingly, it is possible to prevent stiction between the magnetic recording medium according to the invention and the head slider flying on the magnetic recording medium and mounted with a magnetic head for reading/writing magnetic recording information. Thus, a problem such as crush of the magnetic head caused by the stiction can be suppressed conspicuously. Further, it is not necessary to provide a step of giving a texture to the surface of the magnetic recording medium. Thus, the cost can be reduced. In addition, the spacing loss can be reduced due to a small distance between the magnetic recording layer formed in the magnetic recording medium and the magnetic head. Moreover, it is not necessary to give a texture to any data track region. Thus, irregularities in the servo pattern region can be suppressed to be so small that the S/N ratio of reproduced data in the data track region can be improved.

In the magnetic recording medium according to the aforementioned embodiment of the invention, the undercoat layer 2, the soft magnetic layer 3 and the orientation layer 4 are formed under the magnetic recording layer 5. The invention is not limited to such a configuration. The configuration of layers under the magnetic recording layer 5 can be changed suitably in accordance with the kind of magnetic recording medium. For example, one or two layers of the undercoat layer 2, the soft magnetic layer 3 and the orientation layer 4 may be omitted, or the magnetic recording layer 5 may be formed directly on a substrate.

In the aforementioned embodiment, the magnetic recording medium 10 according to the invention is a perpendicular recording discrete track type magnetic disk in which the magnetic recording layer 5 is divided at minute intervals in the radial direction of tracks. However, the invention is not limited to such a configuration. Not to say, the invention is also applicable to a magnetic disk in which a magnetic recording layer is divided at minute intervals in the circumferential direction (sector direction) of tracks, a magnetic disk in which a magnetic recording layer is divided at minute intervals in both the radial direction and the circumferential direction of tracks, a palm type magnetic disk having a magnetic recording layer with a continuous concavo-convex pattern as shown in FIG. 1B, and a magnetic disk having a spiral magnetic recording layer.

(Method for Manufacturing Magnetic Recording Medium)

Next, description will be made about an example of a method for manufacturing the aforementioned magnetic recording medium. FIGS. 6A-6H and 7A-7C are sectional views for explaining a manufacturing process of the magnetic recording medium according to the invention. Incidentally, the following manufacturing method is merely an example. Manufacturing the magnetic recording medium is not limited to the following method.

Figure 6A:
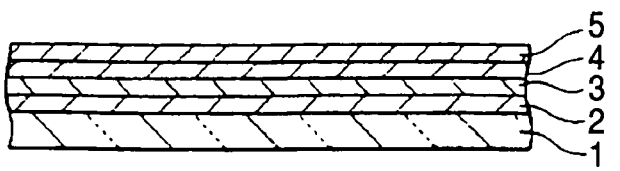
FIGS. 6A-6H are sectional views for explaining a manufacturing process of the magnetic recording medium according to the invention.
Figure 6B:
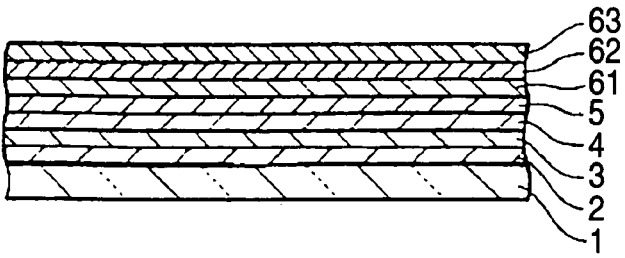
Figure 6C:
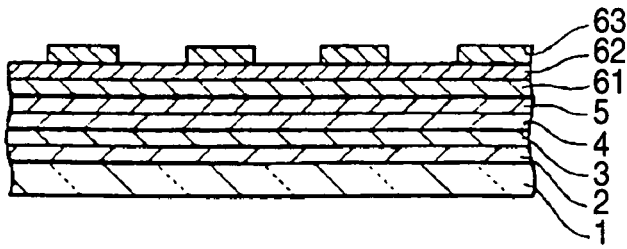
Figure 6D:
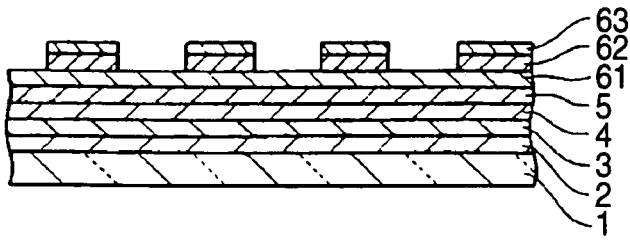
Figure 6E:
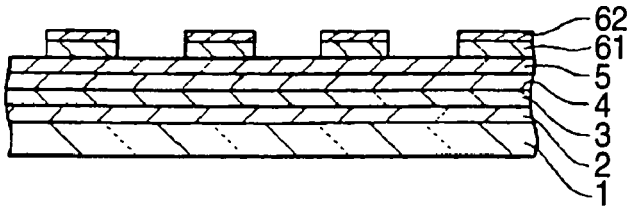

First, a disk substrate 1 is prepared, and an undercoat layer 2, a soft magnetic layer 3, an orientation layer 4 and a magnetic recording layer 5 are formed and laminated with predetermined thicknesses on the disk substrate 1 in that order, for example, by a sputtering method or the like (see FIG. 6A). A first mask layer 61 and a second mask layer 62 are formed and laminated on the magnetic recording layer 5 in that order, for example, by a sputtering method or the like, and a resist layer 63 is further laminated thereon, for example, by a dipping method or a spin coat method (see FIG. 6B). Here, for example, the first mask layer 61 is formed out of TiN or the like, the second mask layer 62 is formed out of Ni or the like, and the resist layer 63 is formed out of negative type resist (such as brand name NBE22A made by Sumitomo Chemical Co., Ltd.).

Next, a predetermined concavo-convex pattern is transferred to the resist layer 63 by a nano-imprint method so as to form a resist pattern. After that, the resist layer at the bottom of each concave portion of the resist pattern is removed by reactive ion etching using $O_2$ gas as reactive gas (see FIG. 6C). Alternatively, the resist pattern may be formed by a photolithographic method.

Next, the second mask layer 62 exposed from the bottom of each concave portion of the resist pattern is removed, for example, by ion beam etching using Ar (argon) gas. For example, the second mask layer 62 formed out of Ni or the like is removed by ion beam etching at an ion incident angle of 90°. In this event, the resist layer 63 formed in regions other than the concave portions is also removed slightly (see FIG. 6D). After that, the first mask layer 61 at the bottom of each concave portion is removed, for example, by reactive ion etching using $SF_6$ (sulfur hexafluoride) gas (see FIG. 6E). Thus, the magnetic recording layer 5 is exposed from the bottom of each concave portion. Incidentally, on this occasion, the resist layer 63 formed in regions other than the concave portions is removed perfectly. On the other hand, the second mask layer 62 in regions other than the concave portions is removed partially, but a certain quantity thereof remains.

Figure 6F:
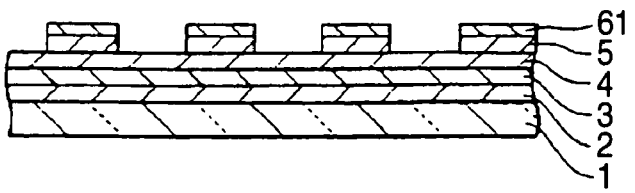

Next, the magnetic recording layer 5 exposed from the bottom of each concave portion is removed, for example, by reactive ion etching using CO gas and $NH_3$ gas as reactive gas (see FIG. 6F). Thus, the magnetic recording layer 5 is formed with a predetermined concavo-convex pattern. Incidentally, by this reactive ion etching, the second mask layer 62 in regions other than the concave portions is removed perfectly, and the first mask layer 61 in regions other than the concave portions is also removed partially. A certain quantity of the first mask layer 61 remains on the magnetic recording layer 5. Incidentally, by use of the reactive ion etching, each concave portion in each servo pattern region 21 where the pitch of the concavo-convex pattern and the width of each concave portion are larger than those in each data track region 20 is processed to be deeper than each concave portion in the data track region 20.

Figure 6G:
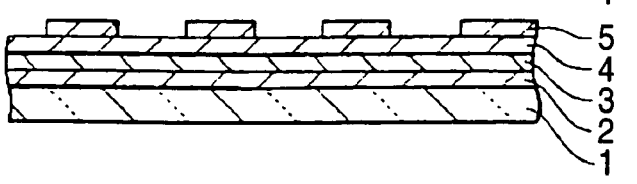
Figure 6H:
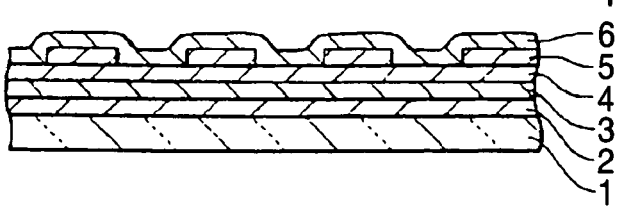
Figure 7A:
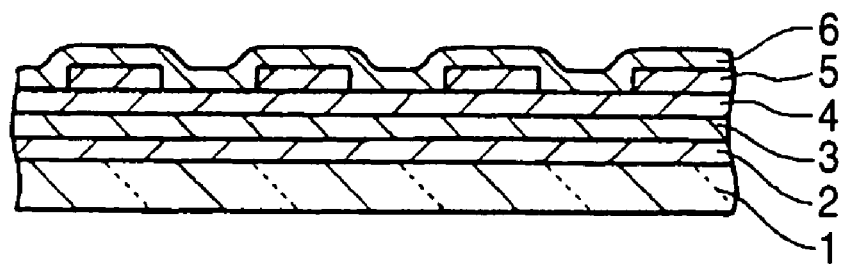
FIGS. 7A-7C are sectional views for explaining the manufacturing process of the magnetic recording medium according to the invention.
Figure 7B:
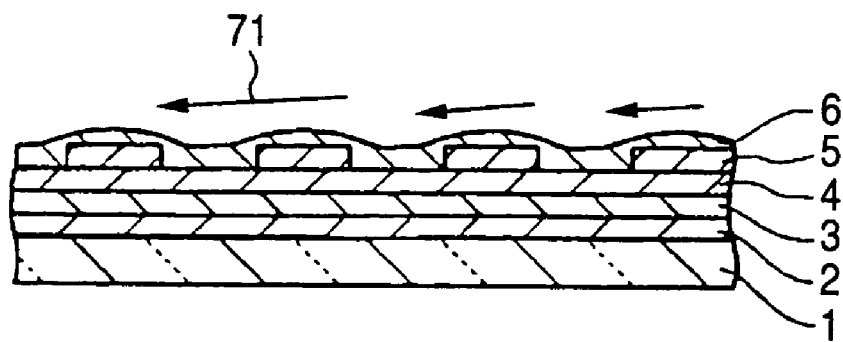
Figure 7C:
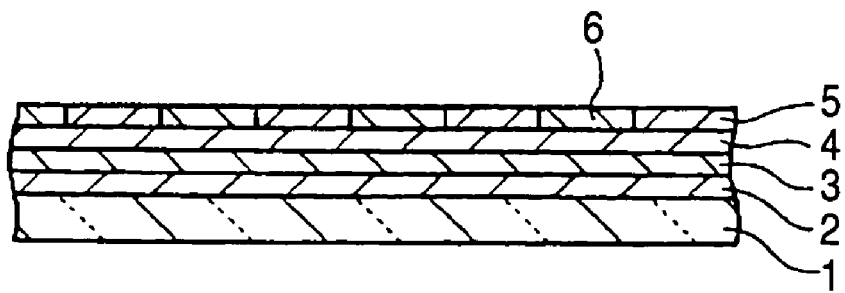

Next, the first mask layer 61 remaining on the magnetic recording layer 5 is removed perfectly, for example, by reactive ion etching using $SF_6$ gas as reactive gas (see FIG. 6G). Thus, the magnetic recording layer 5 having a predetermined concavo-convex pattern is formed.

Residual reactive gas is removed by dry cleaning. After that, for example, a non-magnetic material made of $SiO_2$ is formed into a film by a sputtering method so that the non-magnetic material is filled into concave portions of the concavo-convex pattern made of the magnetic recording layer 5. Thus, a non-magnetic layer 6 is formed (see FIG. 6H). The non-magnetic layer 6 is formed not only in the concave portions of the concavo-convex pattern but also on the magnetic recording layer 5. When the non-magnetic layer 6 is formed in many steps, the surface of a to-be-processed body filmed therewith can be flattened. For example, a second layer of the non-magnetic layer is formed with bias power being applied to the surface of the to-be-processed body to be filmed with the non-magnetic layer. Thus, the flatness of the upper surface of the formed non-magnetic layer can be improved.

Next, the surface of the to-be-processed body wholly filmed with the non-magnetic layer 6 is etched by an ion beam etching method using Ar gas. Thus, the non-magnetic layer 6 higher than the surface position of the magnetic recording layer 5 is removed so that the surface of the to-be-processed body is flattened (see FIGS. 7A-7C). For example, the to-be-processed body filmed with the non-magnetic layer 6 on the magnetic recording layer 5 is irradiated with an ion beam 71, for example, at an incident angle of 2°. The surface of the to-be-processed body can be flattened thus by ion beam etching.

Incidentally, in this specification, the term "ion beam etching" is used as a generic term of processing methods for irradiating a to-be-processed body with ionized gas to thereby remove a layer, such as ion milling. The ion beam etching is not limited to a processing method for irradiating the to-be-processed body with a narrowed ion beam. The term "incident angle" means an incident angle of an ion beam (ionized gas) with respect to the surface of the to-be-processed body, which angle is synonymous with the angle formed between the surface of the to-be-processed body and the central axis of the ion beam. For example, when the central axis of the ion beam is parallel to the surface of the to-be-processed body, the incident angle is 0°. When the central axis of the ion beam is perpendicular to the surface of the to-be-processed body, the incident angle is 90°.

Next, the protective layer 7 is formed on the upper surfaces of the magnetic recording layer 5 and the non-magnetic layer 6 by a CVD (Chemical Vapor Deposition) method. Further the lubricating layer 8 is formed on the protective layer 7 by a dipping method. Thus, the magnetic recording medium according to the invention is completed.

In the aforementioned method for manufacturing the magnetic recording medium, reactive ion etching is used as a method for etching the magnetic recording layer 5 to form a predetermined concavo-convex pattern. Accordingly, each servo pattern region 21 where the pitch of the concavo-convex pattern and the width of each concave portion are larger than those in each data track region 20 is etched to be deeper than the data track region 20. As a result, when the non-magnetic layer 6 is filled into concave portions of the formed concavo-convex pattern by a sputtering method or the like, the surface position of the non-magnetic layer 6 formed in the servo pattern region 21 is generally lower than the surface position of the non-magnetic layer 6 formed in the data track region 20. Accordingly, by ion beam etching performed subsequently, the surface position of the non-magnetic layer 6 in the servo pattern region 21 can be made lower than the surface position of the non-magnetic layer 6 in the data track region 20 as shown in FIGS. 3A-3B and 4A-4B. Thus, concaves and convexes can be formed in the servo pattern region 21.

The etching rate of the magnetic recording layer 5 or the non-magnetic layer 6 can be changed by adjusting various conditions (the gas pressure, the bias power, etc. at the time of film formation) with which the non-magnetic layer 6 is filled into the concave portions of the concavo-convex pattern formed by the magnetic recording layer 5, or various conditions (the irradiation angle of an ion beam, the kind of gas, etc.) with which the surface of the to-be-processed body is flattened by ion beam etching. Accordingly, in each data track region 20, the etching rate of the magnetic recording layer 5 can be made equal to that of the non-magnetic layer 6. For example, when etched particles are monitored by a mass spectroscope, it is possible to use a method in which flattening is completed as soon as the material of the magnetic recording layer 5 begins to be detected. By combination of the aforementioned methods, the structures shown in FIGS. 3A-3B, 4A-4B and 5A-5B can be obtained.

As described above, in order to manufacture the magnetic recording medium according to the invention, the depth of the concave portions of the concavo-convex pattern can be changed between each data track region 20 and each servo pattern region 21 particularly by reactive ion etching. Thus, concaves and convexes can be provided in the surface of the servo pattern region 21 after the non-magnetic layer is filled into the concave portions. Further, processing conditions such as etching rates of the magnetic recording layer 5 and the non-magnetic layer 6, ion beam incident angle dependencies or gas dependencies of the etching rates of the layers 5 and 6, etc. are optimized so that magnetic recording media according to the aforementioned embodiments can be manufactured. In a hard disk drive or the like provided with such a magnetic recording medium, the surface of the magnetic recording medium is not too flat, so that increase in frictional resistance between the magnetic recording medium and a head slider can be suppressed. As a result, increase in frictional resistance between the magnetic recording medium and the head slider flying on the magnetic recording medium and reading/writing magnetic recording information can be suppressed to prevent stiction between the magnetic recording medium and the head slider.

(Magnetic Recording-reproducing Device)

Next, description will be made about magnetic recording-reproducing device according to the invention.

Figure 8:
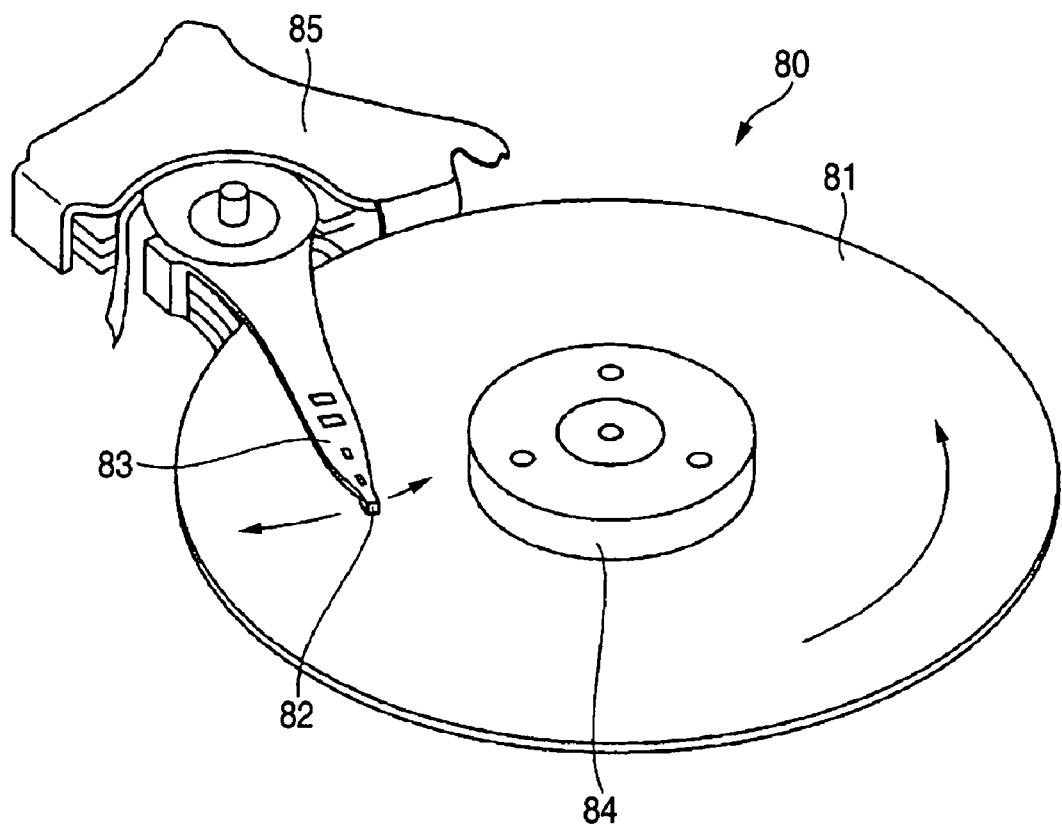
FIG. 8 is a perspective view showing an embodiment of magnetic recording-reproducing device according to the invention.

FIG. 8 is a perspective view showing an embodiment of magnetic recording-reproducing device according to the invention. The magnetic recording-reproducing device 80 according to the invention has a magnetic recording medium 81 according to the invention, which has been described above, a head slider 82 designed to at least partially fly on the surface of the magnetic recording medium 81 at the time of recording-reproducing, and a magnetic head mounted on the head slider 82 and for recording-reproducing information into/from the magnetic recording medium 81.

The magnetic recording medium 81 rotates at a high speed in accordance with the rotation of a spindle motor 84. The head slider 82 provided on the tip of a swing arm 83 flies due to an air flow generated by the rotation of the magnetic recording medium 81. An actuator 85 is driven in accordance with a servo signal in a servo signal region formed in the magnetic recording medium 81. Thus, the swing arm 83 is swung so that the head slider 82 can trace a track formed on the magnetic recording medium 81 accurately.

In the magnetic recording-reproducing device according to the invention, it is preferable that the circumferentially continuous length of each data track region 20 in the magnetic recording medium 81 does not exceed the circumferential length of the head slider 82. With this configuration, at least a part of the head slider 82 is always located on any one of the servo pattern regions 21 having concaves and convexes. Thus, stiction of the head slider can be prevented more surely.

As described above, the magnetic recording-reproducing device according to the invention has the aforementioned magnetic recording medium according to the invention. Accordingly, it is possible to prevent stiction between the magnetic recording medium and the head slider flying on the magnetic recording medium and mounted with the magnetic head for reading/writing magnetic recording information. Thus, it is possible to provide magnetic recording-reproducing device which can conspicuously suppress problems such as crush of the magnetic head caused by the stiction and which is low in spacing loss between the magnetic head and the magnetic recording layer and excellent in cost merit.

EXAMPLES

The invention will be described below more in detail using examples and comparative examples.

(Manufacturing of To-Be-Processed Body)

First, a to-be-processed body for forming a discrete track type magnetic recording medium was manufactured. A disk substrate 1 made of a glass substrate and having a thickness of 630 µm was filmed with an undercoat layer 2, a soft magnetic layer 3, an orientation layer 4, a magnetic recording layer 5 (20 nm thick), a first mask layer (TiN: 25 nm thick) and a second mask layer (Ni: 10 nm thick) in that order. The filmed sample was coated with negative type resist (brand name: NEB22A made by Sumitomo Chemical Co., Ltd.) by a spin coat method so that a resist layer 100 nm thick was formed. By use of a stamper having a predetermined concavo-convex shape, the concavo-convex shape was transferred to the resist layer on the sample surface by a press using a nano-imprint method, and reactive ion etching using $O_2$ gas as reactive gas was performed thereon. Thus, a resist pattern made from micro-figures was formed while the resist layer at the bottom of each concave portion was removed. Next, using the resist pattern as a mask, the micro-figures of the resist pattern were transferred to the second mask layer by an ion beam etching method using Ar gas. Thus, a second mask pattern made from the micro-figures was formed. Next, using the second mask pattern as a mask, the micro-figures of the second mask pattern were transferred to the first mask layer by a reactive ion etching method using $SF_6$ gas as reactive gas. Thus, a first mask pattern made from the micro-figures was formed. Next, using the first mask pattern as a mask, the micro-figures of the first mask pattern were transferred to the magnetic recording layer 5 by a reactive ion etching method using CO gas and $NH_3$ gas as reactive gas. Thus, a magnetic recording layer pattern made from the micro-figures was formed. Next, the first mask layer retained on the magnetic recording layer pattern was removed by a reactive ion etching method using $SF_6$ gas as reactive gas.

Figure 9:
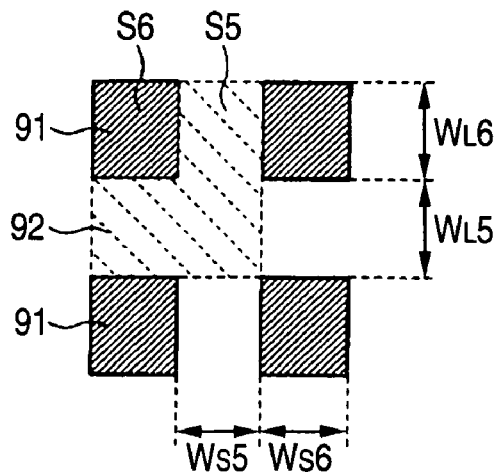
FIG. 9 is a schematic plan view showing the area ratio of each convex portion to each concave portion in each servo burst signal region.

By the aforementioned method, a to-be-processed body for forming a discrete track type magnetic recording medium was manufactured. The processed dimensions of each data track region 20 are 150 nm in track pitch, 90 nm in pattern width of the magnetic recording layer, 1:1.5 in ratio (concave-convex ratio) of the area of each portion (concave portion of the concavo-convex pattern) where the magnetic recording layer was not formed to the area of each portion (convex portion of the concavo-convex pattern) where the magnetic recording layer was formed, 60 nm in width of each portion (concave portion of the concavo-convex pattern) where the magnetic recording layer was not formed, and 22 nm in depth of each concave portion. The position of the magnetic recording layer pattern (concavo-convex pattern) was set to range radially from 10 mm to 30 mm. On the other hand, as for the processed dimensions of each servo pattern region 21, for example, in a servo burst signal region 24 as shown in FIG. 9, the magnetic recording layer pattern constituting each convex portion 92 of the concavo-convex pattern measured 150 nm in radial width $W_L5$ and 100-300 nm in circumferential width $W_S5$, and the pattern constituting each concave portion 91 of the concavo-convex pattern measured 150 nm in radial width $W_L6$ and 100-300 nm in circumferential width $W_S6$. Further, as shown in FIG. 9, the ratio (concave-convex ratio: S6:S5) of the area S6 of each concave portion 91 where the magnetic recording layer was not formed to the area S5 of each convex portion 92 formed out of the magnetic recording layer was set to be 1:3. Incidentally, the depth of each concave portion 91 was 30 nm, and the position of the magnetic recording layer pattern (concavo-convex pattern) was set to range radially from 10 mm to 30 mm in the same manner as in the data track region 20.

Example 1

A non-magnetic layer 6 was formed on the to-be-processed body obtained in the aforementioned manner. First, a film of $SiO_2$ was formed to be 100 nm thick by a sputtering method in the conditions of 500 W in film formation power, 150 W in bias power and 0.3 Pa in Ar gas pressure. Incidentally, the film thickness here means the thickness of a film on a flat surface when the film was formed on the flat surface. Ion beam etching using Ar gas and having an incident angle of 2° was performed on the to-be-processed body after the non-magnetic layer 6 was formed. Thus, a surplus of $SiO_s$ on the magnetic recording layer 5 was removed so that the surface was flattened. The etching was monitored by a mass spectroscope. The flattening was completed as soon as the magnetic recording layer in the data track region 20 began to be detected.

Incidentally, the surface position of the non-magnetic layer 6 is lower in each servo pattern region 21 than in each data track region 20 when the non-magnetic layer 6 has been formed. Accordingly, when ion beam etching is kept on, the magnetic recording layer 5 in the servo pattern region 21 begins to be detected, and after that, the magnetic recording layer 5 in the data track region 20 begins to be detected. The detections of the both can be distinguished based on a change of the rate detected in mass spectrograph. Thus, the flattening of the surface of each data track region 20 can be attained by suspending the ion beam etching as soon as the magnetic recording layer 5 in the data track region 20 begins to be detected.

DLC 2 nm thick was formed thereon as the protective film 7 by a CVD method. Further on the protective film 7, perfluoropolyether (PFPE) 2 nm thick was formed as the lubricating layer 8 by a dipping method. Thus, a magnetic recording medium in Example 1 was manufactured.

The magnetic recording medium manufactured thus had a mode in which the surface roughness of concaves and convexes existing in the surface of each data track region 20 was extremely low, while the surface roughness of concaves and convexes existing in the surface of each servo pattern region 21 was high. In this mode, of the concaves and convexes in the surface of the servo pattern region 21, the convex portions were made of the magnetic recording layer, and there was a difference in surface level between the magnetic recording layer and the non-magnetic layer forming the concave portions.

The irradiation angle of an ion beam was regarded as 0° in the case of irradiation with the ion beam incident on the magnetic recording medium in parallel to its surface, and regarded as 90° in the case of irradiation with the ion beam incident on the magnetic recording medium perpendicularly to its surface. In Example 1, due to irradiation with the ion beam at an incident angle of 2°, the etching rate of the non-magnetic layer is higher than the etching rate of the magnetic recording layer. Thus, the etching depth of the non-magnetic layer filled between elements of the magnetic recording layer in each servo pattern region 21 becomes larger.

The difference in surface level between each concave and each convex in each servo pattern region 21 of the magnetic recording medium manufactured thus was 2.5 nm, and Ra (arithmetical mean deviation of the assessed profile) thereof was 0.9 nm. On the other hand, Ra (arithmetical mean deviation of the assessed profile) in the surface of each data track region 20 was 0.3 nm.

Figure 10:
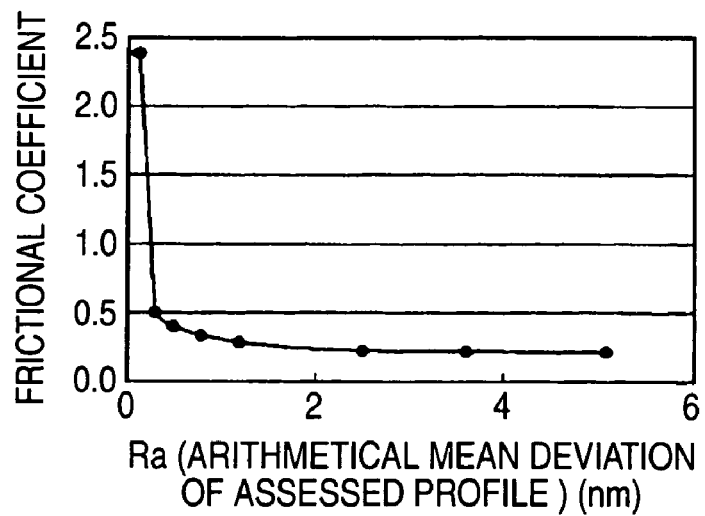
FIG. 10 is a graph showing the relationship between the arithmetical mean deviation of the assessed profile and the frictional coefficient in the surface of the magnetic recording medium.

FIG. 10 shows the relationship between the arithmetical mean deviation of the assessed profile and the frictional coefficient in the surface of the magnetic recording medium, obtained from a sliding test of a head slider. The relationship between the arithmetical mean deviation of the assessed profile and the frictional coefficient shown in FIG. 10 was obtained using samples different in arithmetical mean deviation of the assessed profile and measured by a tester to be used in a CSS (Contact Start Stop) test. As is apparent from the relationship in FIG. 10, the frictional coefficient rises suddenly when the arithmetical mean deviation of the assessed profile of the surface is not higher than 0.3 nm. This fact indicates that stiction of the magnetic head occurs easily when the arithmetical mean deviation of the assessed profile of the surface is not higher than 0.3 nm.

Example 2

A magnetic recording medium shown in FIGS. 4A-4B was manufactured in a method similar to that in Example 1. This magnetic recording medium could be manufactured as follows. That is, in the ion beam etching of the non-magnetic layer in Example 1, the ion beam etching had been suspended since the magnetic recording layer 5 in each servo pattern region 21 began to be detected and till the magnetic recording layer 5 in each data track region 20 began to be detected. Thus, flattening was completed.

Example 3

A magnetic recording medium shown in FIGS. 5A-5B was manufactured in a method similar to that in Example 1. This magnetic recording medium could be manufactured as follows. That is, in the ion beam etching of the non-magnetic layer in Example 1, the ion beam etching was once suspended as soon as the magnetic recording layer 5 in each servo pattern region 21 began to be detected. The incident angle was changed from 2° to 90° (90° was an incident angle with which "the etching rate of the magnetic recording layer 5 was higher than the etching rate of the non-magnetic material ($SiO_2$)"), and the ion beam etching was resumed. The ion beam etching was suspended as soon as the magnetic recording layer 5 in each data track region 20 began to be detected. Thus, flattening was completed.

This application is based upon and claims the benefit of priority of Japanese Patent Application No. 2004-50816 filed on Feb. 26, 2004, the contents of which are incorporated herein by reference in its entirety.

What is claimed is:

1. A magnetic recording medium comprising:
   a disk substrate;
   a magnetic recording layer formed with a predetermined concavo-convex pattern on said disk substrate; and
   a non-magnetic layer filled into concave portions of said concavo-convex pattern,
   wherein said magnetic recording medium has data track regions and servo pattern regions,
   wherein concaves and convexes exist in a surface of each of said servo pattern regions, and
   wherein arithmetical mean deviation of the assessed profile of a surface of each of said data track regions is lower than arithmetical mean deviation of the assessed profile of a surface of each of said servo pattern regions.

2. A magnetic recording medium according to claim 1, wherein arithmetical mean deviation of the assessed profile of a surface of each of said servo pattern regions is not lower than 0.3 nm.

3. A magnetic recording medium according to claim 1, wherein a difference in surface level between each of said concaves and each of said convexes existing in a surface of each of said servo pattern regions is not higher than 6 nm.

4. A magnetic recording medium according to claim 1, wherein said concaves and convexes existing in a surface of each of said servo pattern regions are formed by a difference in surface level between said magnetic recording layer and said non-magnetic layer, and a thickness-direction surface position of said magnetic recording layer is higher than a thickness-direction surface position of said non-magnetic layer in each of said servo pattern regions.

5. A magnetic recording medium according to claim 1, wherein a thickness-direction surface position of said non-magnetic layer is not higher than a thickness-direction surface position of said magnetic recording layer.

6. A magnetic recording medium according to claim 1, wherein said magnetic recording layer is absent from said concave portions of said concavo-convex pattern.

7. A magnetic recording medium according to claim 1, wherein a non-magnetic material for forming said non-magnetic layer is comprised of one or more compounds selected from oxides, nitrides and carbides.

8. A magnetic recording medium according to claim 1, wherein a non-magnetic material for forming said non-magnetic layer is a material having an amorphous structure or a microcrystalline material.

9. A magnetic recording medium according to claim 1, wherein a non-magnetic material for forming said non-magnetic layer has silicon dioxide as a main component thereof.

10. Magnetic recording-reproducing device comprising:
    a magnetic recording medium according to claim 1;
    a head slider designed to at least partially fly on a surface of said magnetic recording medium at the time of recording-reproducing; and a magnetic head mounted on said head slider and for recording-reproducing information into/from said magnetic recording medium.

11. Magnetic recording-reproducing device according to claim 10, wherein circumferentially continuous length of each of said data track regions in said magnetic recording medium is not longer than circumferential length of said head slider.

* * * * *